Oct. 23, 1934.  F. H. BROWN  1,977,620
STOKER
Original Filed Dec. 21. 1922  7 Sheets-Sheet 3
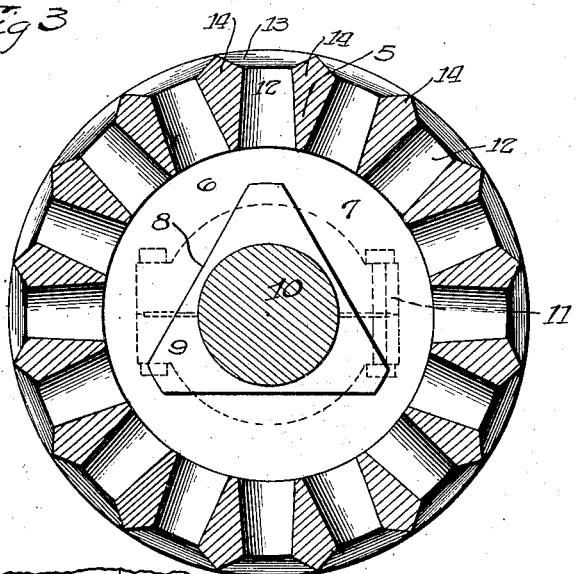
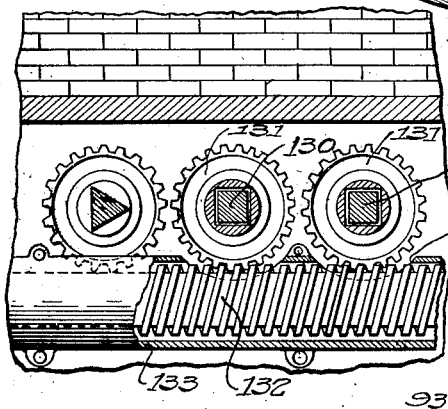
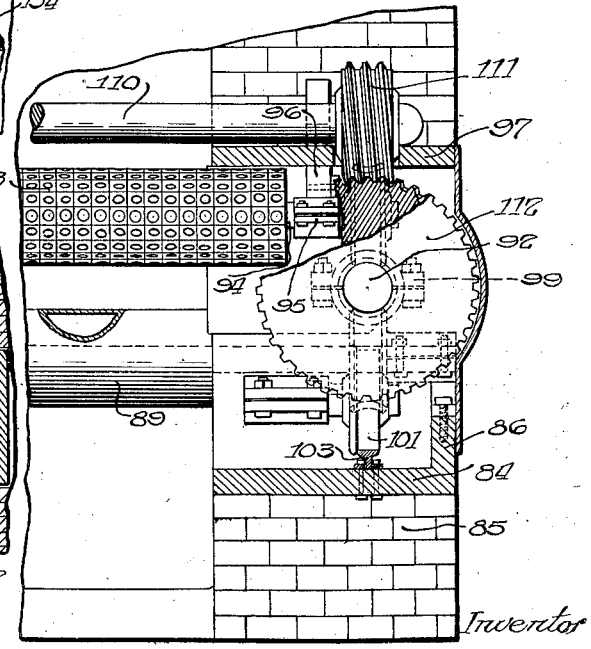
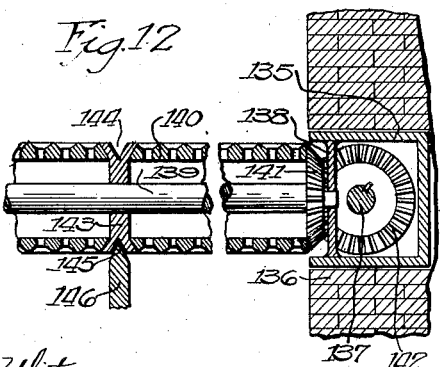

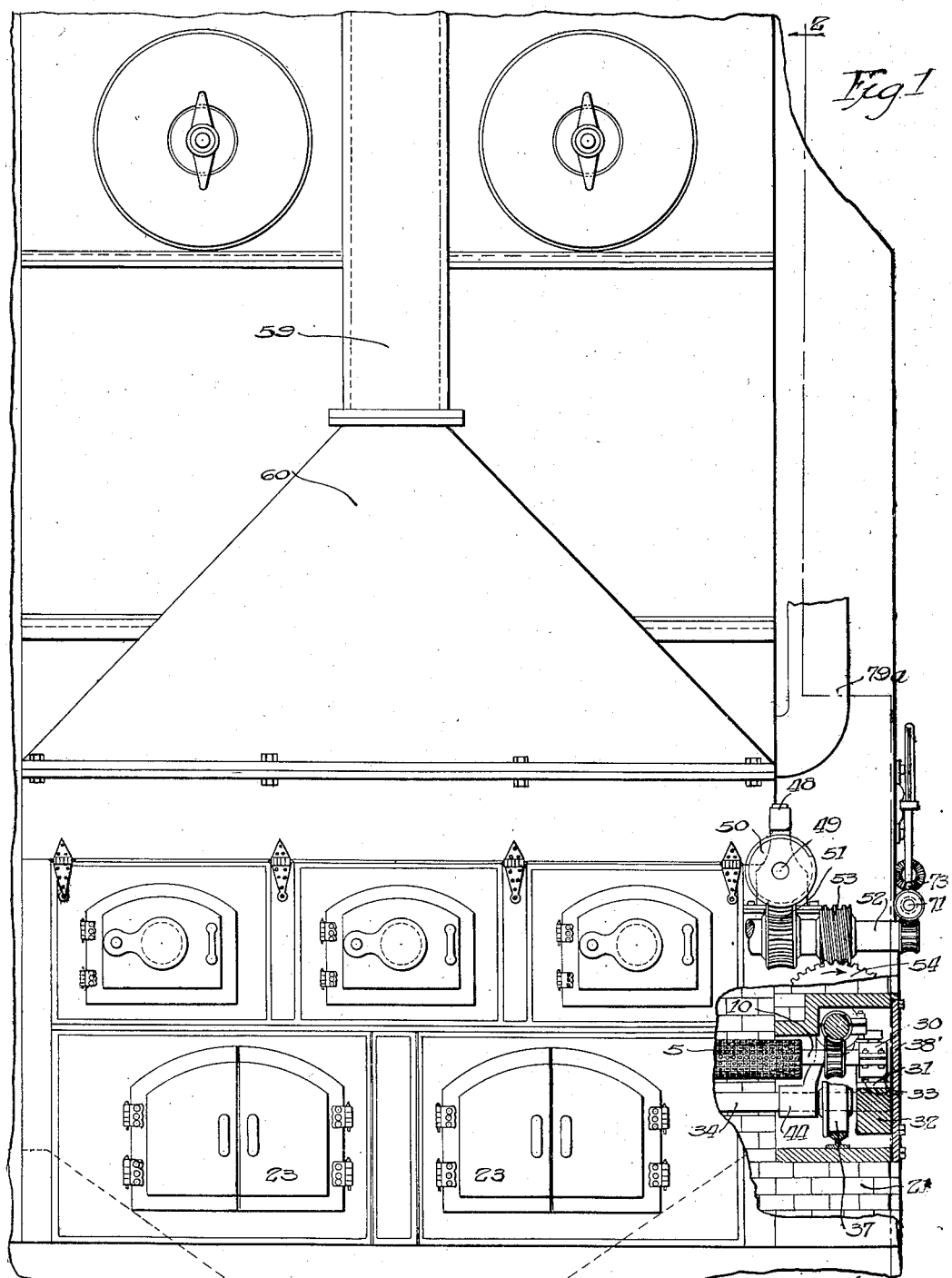

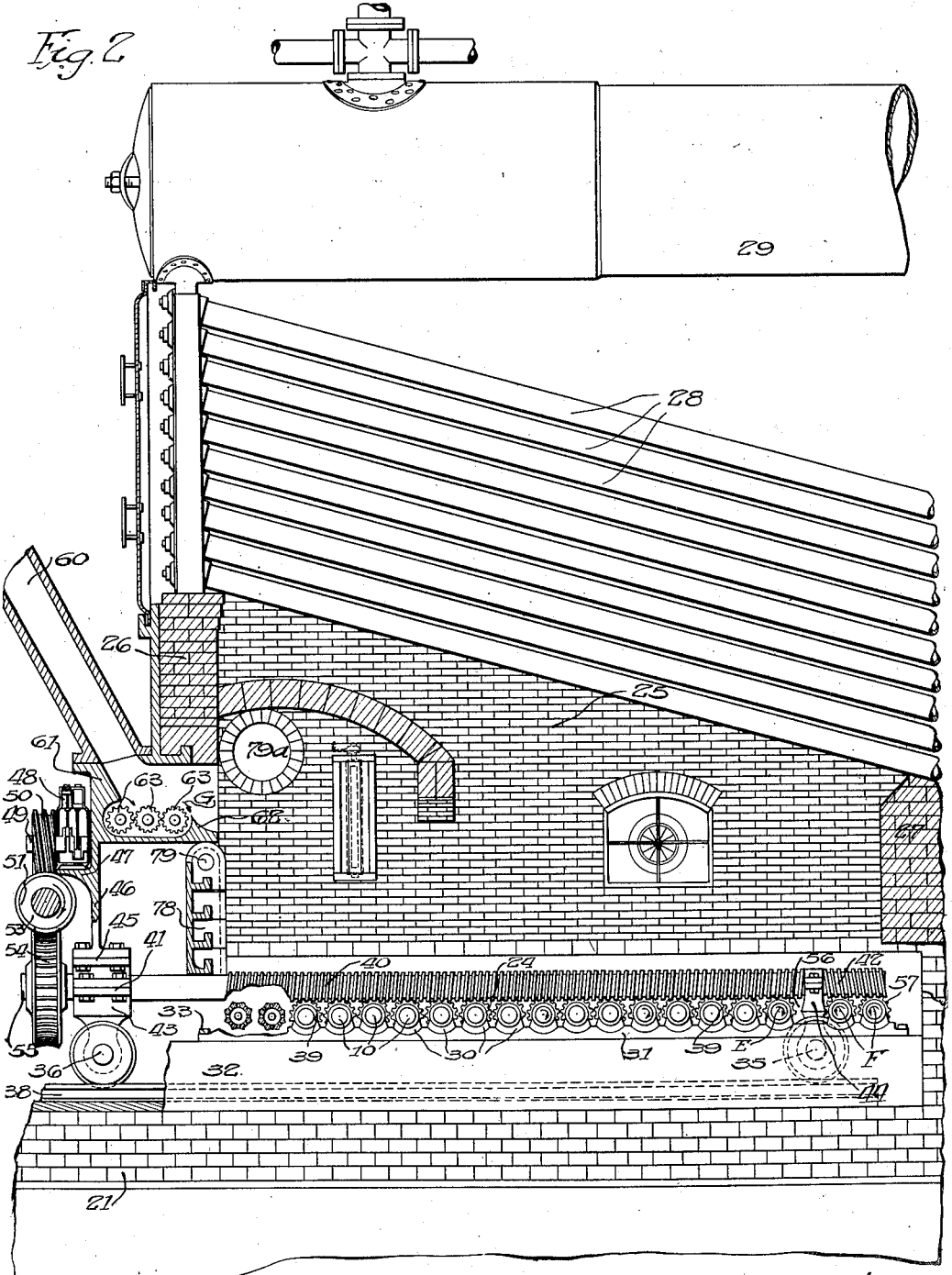

Oct. 23, 1934. F. H. BROWN 1,977,620
STOKER
Original Filed Dec. 21, 1922 7 Sheets-Sheet 4
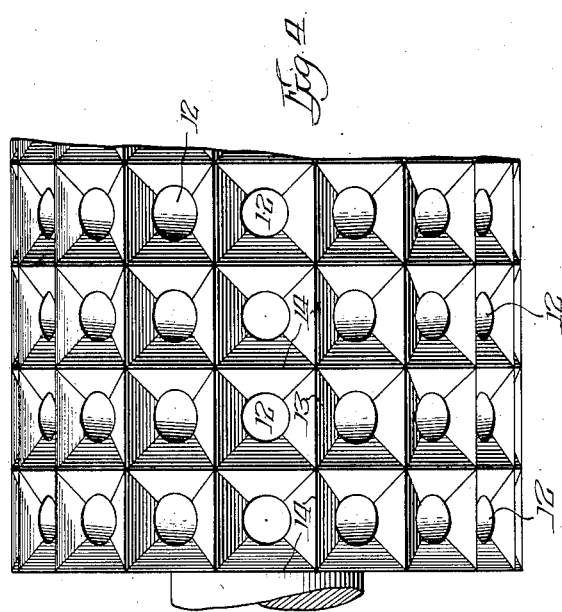
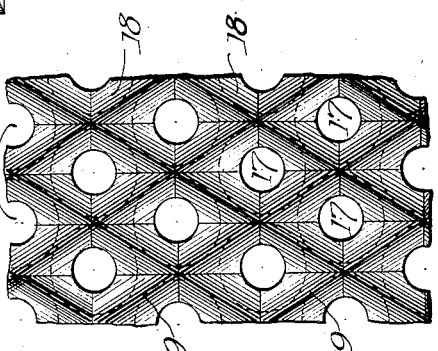
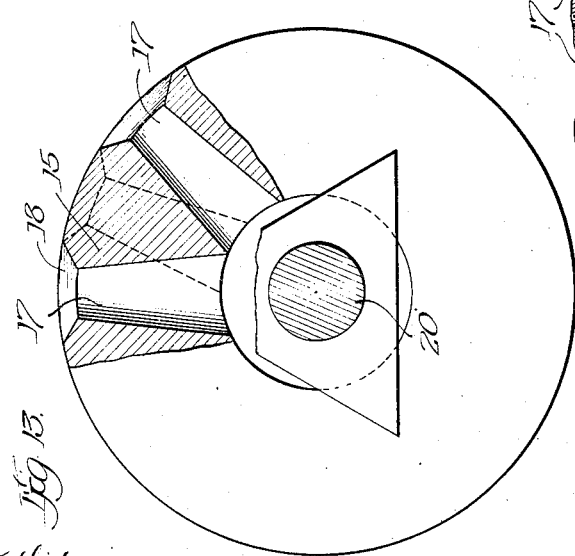

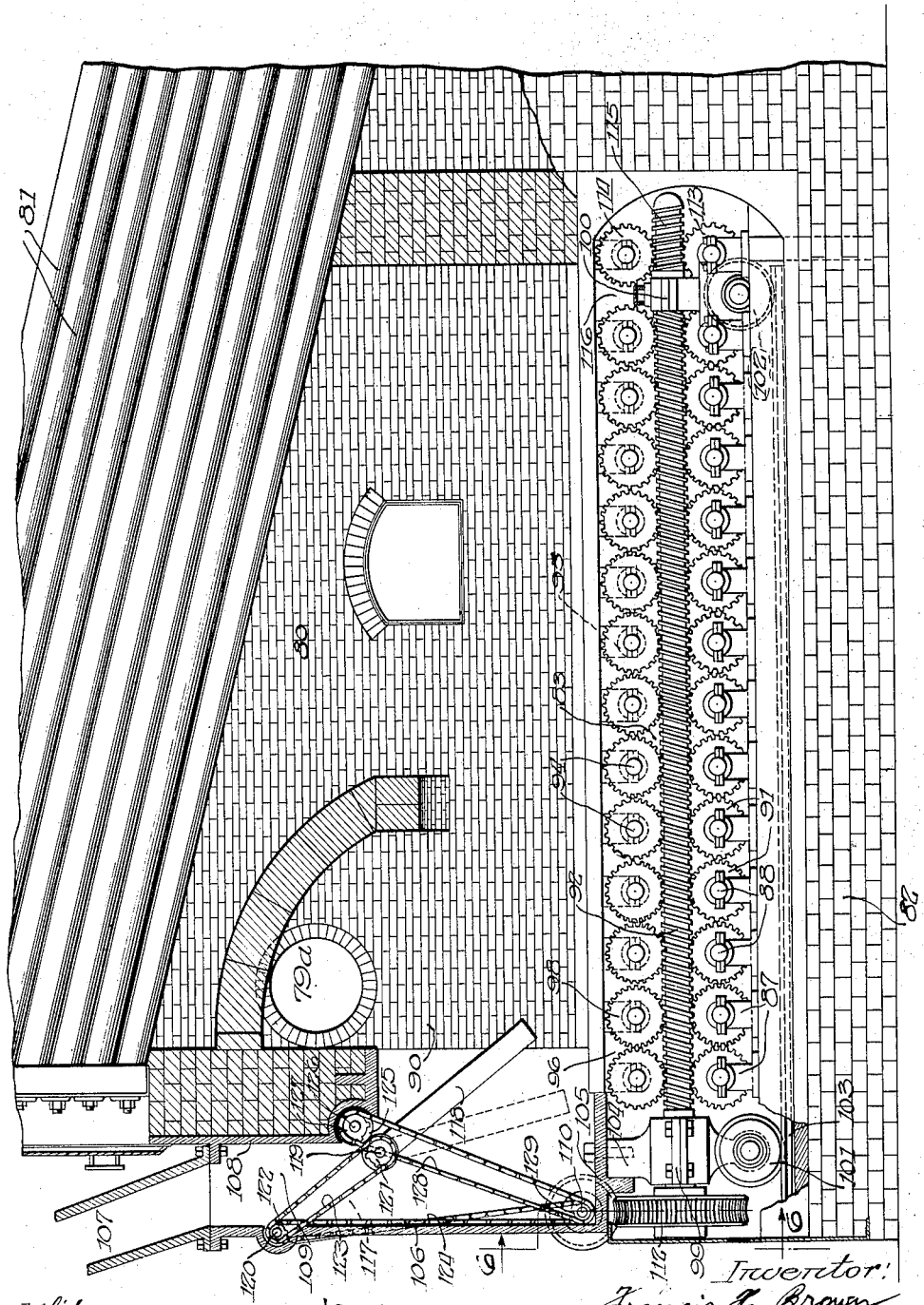

Oct. 23, 1934.   F. H. BROWN   1,977,620
STOKER
Original Filed Dec. 21, 1922   7 Sheets-Sheet 6
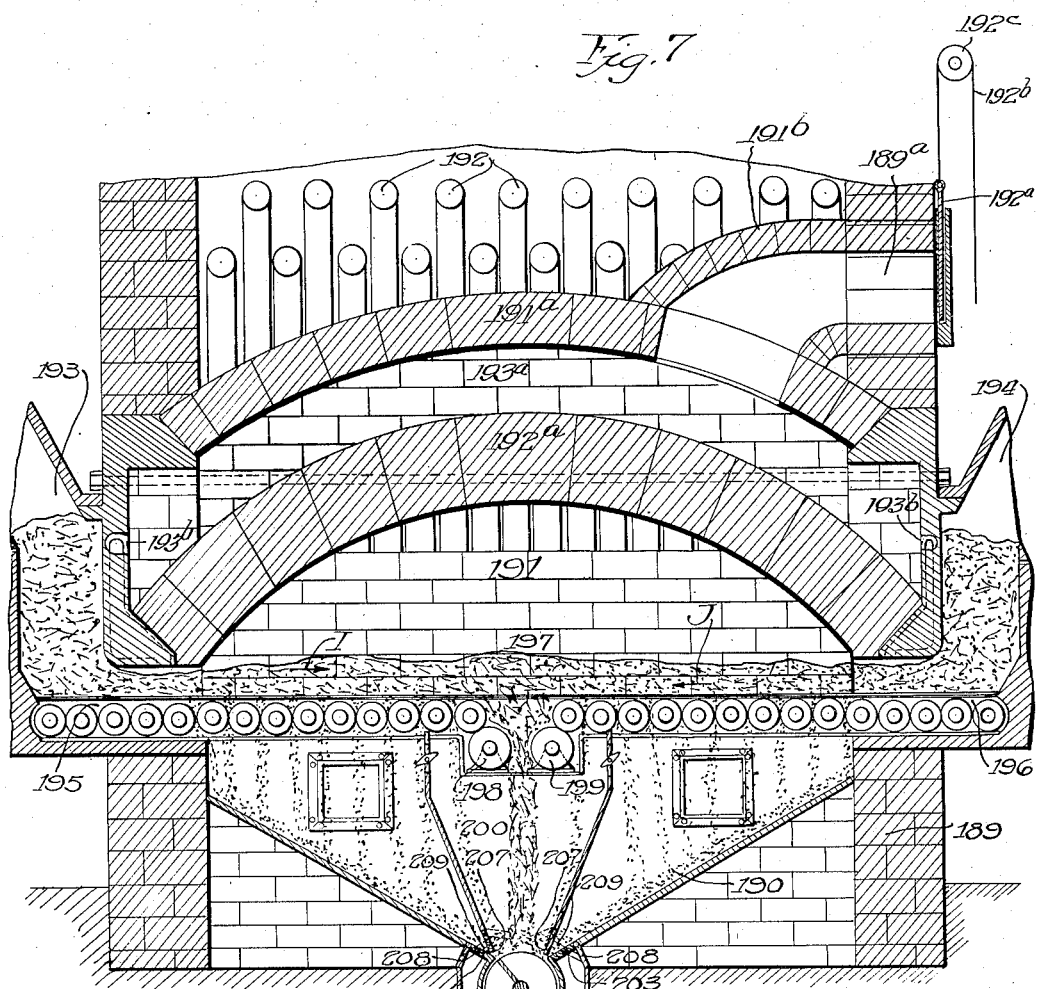
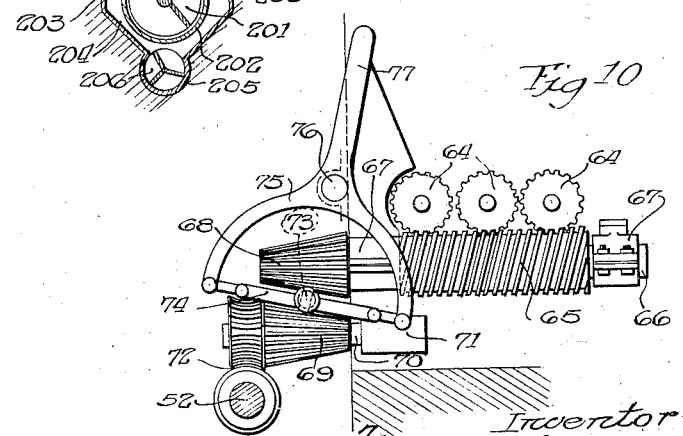

Oct. 23, 1934.                F. H. BROWN                1,977,620
                                STOKER
                  Original Filed Dec. 21, 1922    7 Sheets-Sheet 7
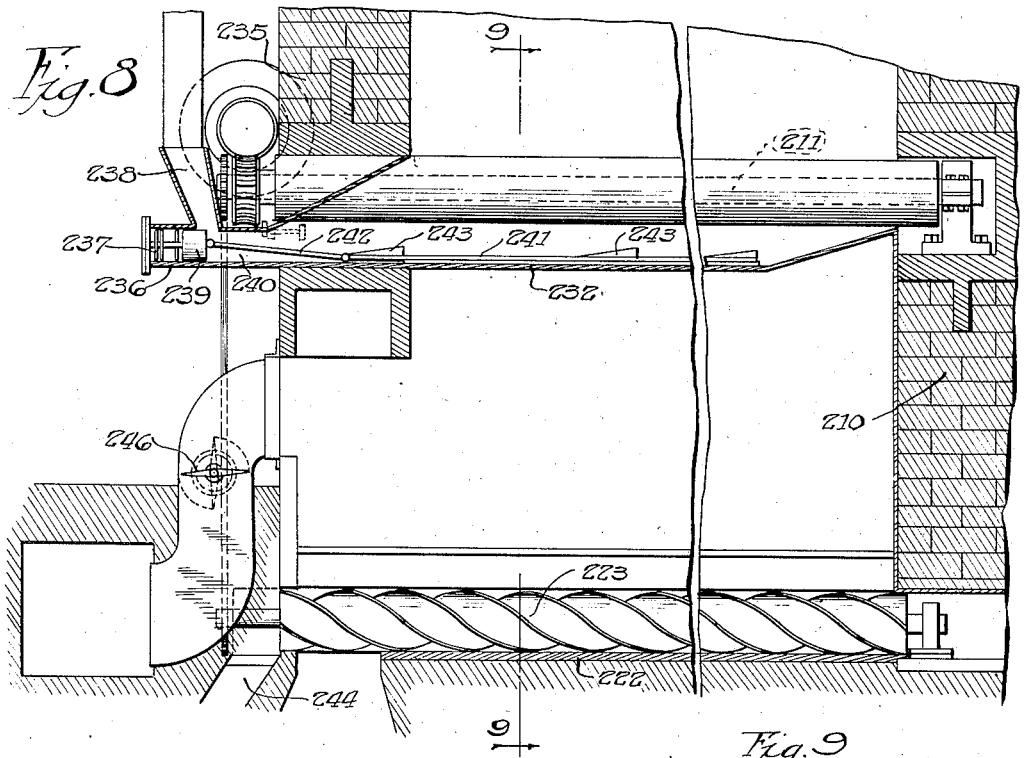
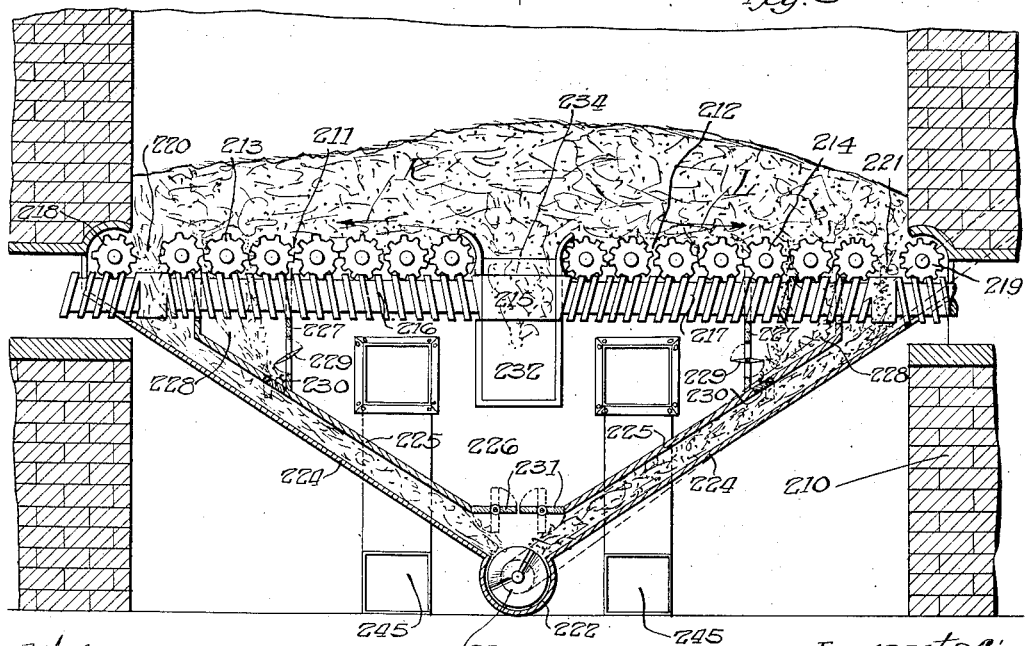

Patented Oct. 23, 1934

1,977,620

UNITED STATES PATENT OFFICE 1,977,620

STOKER

Francis H. Brown, Ridley Park, Pa., assignor to The Real Estate-Land Title and Trust Company, a corporation of Pennsylvania Application December 21, 1922, Serial No. 608,228
Renewed January 18, 1934

11 Claims. (Cl. 110—35)

This invention relates broadly to conveying and distributing material, and more particularly pertains to improvements in apparatus for feeding solid fuel, such as coal and the like, to furnaces, such apparatus being commonly known as stokers.

While this invention is illustrated as embodied in an automatic stoking device for the purpose of delivering and distributing fuel in a furnace, whereby to increase the efficiency and the utility of the furnace, it will be readily understood that the invention is not limited to such an adaptation, but finds a wide field of utility for other purposes.

Among the more important objects and advantages which characterize this invention, are: the provision of an improved apparatus for conveying and distributing material; the provision of an improved apparatus for conveying and distributing fuel, such as coal and the like; the provision of an improved apparatus for delivering fuel, such as coal for use within a furnace; the provision of an improved method of and apparatus for stoking a furnace; the provision of an improved grate structure for a furnace and the like.

It is an important object of this invention to provide an improved mechanism for sizing and evenly and uniformly distributing the fuel delivered to a furnace, and to this end the invention involves an improved grate bar structure which is characterized by the provision of a grate bar comprising a perforated tube; the provision of a grate bar provided with a plurality of radial apertures; the provision of a series of adjacent hollow perforated grate bars; the provision of an improved form of revolving grate bar; the provision of a furnace structure characterized by the provision of revoluble grate bars; the provision of groups of revoluble grate bars; the provision of groups of revoluble grate bars for distributing fuel through the furnace; the provision of a grate bar structure which operates to deliver and distribute fuel to a desired point for consumption and during consumption in a furnace; and for collecting and disposing of ash as formed; the provision of an improved grate structure comprising one or more series of revoluble grate bars; the provision of a grate structure comprising one or more series of peforated revoluble grate bars; the provision of an improved grate structure comprising one or more series of adjacent or contiguous hollow perforated grate bars; the provision of an improved form of grate bar provided with a plurality of series of radially disposed apertures; the provision of an improved revoluble grate bar comprising a cylindrical shell or tube provided with a plurality of circumferential series of radial openings; and the provision, in a furnace grate, of a series of parallel perforated revoluble grate bars adapted to rotate in the same direction and at the same speed relatively, for the purpose of distributing and continuously advancing the fuel delivered to the furnace, and for the purpose of shaking out the resultant ash during its formation. It is to be understood that the various forms of the device here shown and described may be used in a wide field of furnace construction and applicant does not limit such use to the convenient constructions here shown.

The foregoing and such other objects and advantages as may appear or be pointed out as this description proceeds are attained in the structural embodiments illustrated in the accompanying drawings, in which:

Figure 1 is a front elevational view, partly in vertical section, illustrating a furnace equipped with the present invention;

Figure 2 is a vertical longitudinal sectional view taken generally on the plane of line 2—2, of Figure 1, looking in the direction indicated by the arrows;

Figure 3 is an enlarged transverse sectional view of the improved grate bar of this invention;

Figure 4 is a fragmentary elevational view of the grate bar;

Figure 5 is a vertical longitudinal sectional view of a furnace structure involving a modified or alternative form of the present invention;

Figure 6 is a fragmentary vertical enlarged sectional view taken on the plane of the line 6—6 of Figure 5, looking in the direction indicated by the arrows;

Figure 7 is a transverse vertical sectional view illustrating, in part, a furnace structure involving a further modified form of this invention;

Figure 8 is a longitudinal sectional view of a furnace illustrating this invention as applied to an underfeed stoker;

Figure 9 is a transverse vertical sectional view taken on line 9—9 of Figure 8, looking in the direction indicated by the arrows; Figure 10 is a sectional view of a detail.

Figures 11 and 12 are enlarged sectional views of details which illustrate modified forms of the grate bar structure;

Figure 13 is an enlarged fragmentary sectional view of a modified form of the grate bar;

Figure 14 is a fragmentary elevational view of the same.

Referring first more particularly to the improved method of stoking a furnace involved in the present invention, there are the steps of sizing and depositing continuously, or in measured increments, a required quantity of fuel, such as coal and the like, in a furnace; then the step of continuously agitating, conveying, and thus distributing the fuel uniformly throughout the furnace fire box in order to attain a level fire; and, simultaneously with such distribution and during consumption of the fuel, removing the ash from the entire area of the fire bed as such ash is formed, collecting, and disposing of the resultant ash thus maintaining in operation a continuously clean, ash free fire. In attaining the steps including the distribution of fuel and removal of ash during consumption outlined above I provide an improved grate structure, particularly characterized by the provision of revoluble grate bars, arranged in a single group or in multiple groups of any desired lengths.

Referring first to Figures 3, 4, and 6, which exemplify one form of grate bar, I provide a cylindrical shell 5, which is provided with an enlarged axial bore 6, said shell or cylinder 5 being closed by end walls 7 preferably integral therewith. The end walls are provided with polygonal openings 8, and complementally shaped blocks 9 are receivable in said openings. A revoluble shaft 10 is fixedly connected to the blocks 9 and extends axially through the shell 5, which may be made in sections of any desired length and then fixedly secured to shaft 10, said shaft being mounted in suitable bearings 11, arranged as will be more particularly pointed out later.

The cylindrical wall of the shell 5 is provided with radial apertures 12—12, these apertures being substantially frusto-conical in longitudinal cross section, but may be of any desired contour or formation, and having their larger ends presented toward the axis of the shell. The outer portions of the openings 12 are countersunk as at 13—13, so that tapered angularly related shoulders 14—14 are provided. As best seen in Figure 4, the countersunk portions 13 may be substantially square and the apertures of each circumferential series, such as A and B, are complementally disposed in longitudinal alinement. The function of this grate bar is to receive the fuel and keep same constantly agitated, at the same time propelling and distributing the fuel over the fire box area, and permitting a free draft through the grate structure at all times. Furthermore the openings 12 permit the ash, in course of formation, to drop through the grate bar and thus prevent fusing or clogging due to clinkering of the ash on the grate. The shoulders 14—14 serve to provide an uneven abrasive surface on the grate to constantly remove the ash from partially consumed fuel and thus prevent adherence of large particles of fuel and insure complete consumption.

Upon reference to Figures 13 and 14 it will be observed that I have provided a modified form of the grate bar shown in Figures 3 and 4. In this arrangement the shell or cylindrical bar 15 is provided with a wall thicker than that of the cylinder or shell 5, in other words, the bore 16 is of less diameter than that of the bore 6. The shell 15 is provided with a plurality of apertures of any desired contour, such as at 17—17, arranged in circumferential series, but in which the apertures of adjoining series, such as C and D, shown in Figure 14, are relatively offset or staggered, so that instead of each unit of adjacent series being in longitudinal alinement, the apertures of each alternate series are in alinement. This arrangement permits of a finer or closer disposition of the apertures and thus permits of a greater number of draft openings to a bar. However, the grate bar structures shown in Figure 3 will give entirely satisfactory results, and the two bars may be employed in conjunction, as will appear later.

The apertures 17 are of the same shape as the apertures 12 and are provided with countersunk portions 18 at their outer ends. The countersunk portions 18, as best seen in Figure 14, afford tapered shoulders 19, but these shoulders, instead of being right-angularly related, as are the shoulders 14, are disposed at a relatively acute angle. The manner of securing the grate bar 15 to its shaft 20 is accomplished in a manner similar to the manner of securing the grate bar 5 to its shaft 10, that is, slidably mounted thereon and therefore, need not be described here.

The grate bar structure may embody bars of any desired lengths, and may be assembled in any desired and suitable manner for accomplishing the end for which the same is designed, but I prefer to assemble this grate bar structure in a mechanical organization to be presently described. However, the desired results may be attained by arranging a plurality of grate bars similar to those just described, in a continuous series, and then providing means for imparting rotation to the grate bars. It is preferable with some fuels that the bars be placed quite closely related and in the same substantially horizontal plane, and if desired, in some instances, the bars may touch. However, as the bars all are intended to rotate in the same direction in a given series, it is desirable that some space be afforded between them. It will be observed that by the provision of cylindrical grate bars, the burning surface, or that surface presented toward the fire bed, is materially increased in area, probably to approximately thirty-three and one-third per cent over that which would be afforded by a grate bar having the same width of burning surface as the diameter of the cylindrical bar. For instance, a cylindrical bar six inches in diameter affords a surface one-third greater in area than that of a flat bar six inches wide. This makes the invention very desirable and valuable where great capacity (fuel consumption) is required within a restricted area, such as in locomotive furnaces.

Referring now to a simple installation involving the improved grate bar of this invention, it will be seen upon viewing Figures 1 and 2 that there is provided a furnace structure, which includes a bed or base 21, containing an ash pit 22, accessible through the doors 23, and disposed beneath a grate bar structure, generally designated 24, and constructed in accordance with this invention.

The fire-box 25 is provided with the usual end walls 26 and 27, which support water tubes 28 and a header 29. As the boiler structure is not, in detail, essential to this invention, it will be referred to but generally.

The grate structure, as illustrated in Figures 1 and 2, comprises a plurality of the bars 5, hereinbefore described, the shafts 10 of said bars being revolubly mounted in bearings 30—30 which latter are preferably integrally cast with a supporting base 31. It will be understood, of course, that two of the supporting bases 31 are provided, one at either end of the grate carrying shaft 10 where this number is sufficient to support the grate, and that similarly there are provided two abutments 32, only one of which is shown, affording a carriage for supporting the complemental base members 31. The base member, as shown in Figures 1 and 2, is fixedly secured to the top of the abutment, by the provision of cap screws or studs 33, or the like.

The carriage formed by the abutment 32, is mounted on the axles 34 and 35, which are in turn carried by wheels 36 and 37, respectively, said wheels operating on rails 38.

On each of the shafts 10 there are mounted worm gears 39—39, said gears meshing with a worm 40 which extends longitudinally of the grate bar structure and above said gears. The worm 40 is rotatably mounted in split bearings 41 and 42, carried by the upstanding brackets 43 and 44, which latter, as seen in Figures 1 and 2, are suitably mounted upon the axles 34 and 35.

The split bearing 41 is provided with a pedestal portion 45, to which is fixedly secured a supporting bracket member 46. The bracket 46 is provided with a shelf which projects therefrom, and upon said shelf there is fixedly mounted a driving unit, such as a two-cylinder steam engine 48. The shaft 49 of said engine carries a worm 50, which is in meshing engagement with a worm gear 51 fixedly mounted upon an external transverse shaft 52. The shaft 52 carries a worm 53, which is in meshing engagement with a worm gear 54, fixedly mounted on the projecting forward end 55 of the screw or worm 40. It will be seen that as the engine rotates, motion is transmitted through the worm 50, gear 51, worm 53, shaft 52 to the worm gear 54, and in turn rotary motion, at a speed, which may be constant or variable, is transmitted to the worm 40. Of course, a variable speed electric motor may be employed, or the engine may be provided with a controlling throttle. The direction of rotation of the worm 40 is such that the grate bars 5 will be rotated in the direction of the arrows E, Figure 2, and thus, fuel which is deposited upon the grate at the forward end, that is the end near the bearing 41, will be conveyed toward the rear end of the grate structure in the course of consumption.

It is desirable that the ash which does not pass through the perforations in the grate bars or between the grate bars themselves be finally collected at the rear end of the grate and deposited in the ash pit 22, from whence it may be conveyed by suitable mechanism. To this end, the grate structure is provided with an outlet space, which space may be adjustable and is generally designated 56, afforded by spacing two grate bars as shown in Figure 2. In order that the ash, which is conveyed to this end of the grate structure, be deposited through the space 56, two or more grate bars 57—57 are arranged beyond the bracket 44, and the portion 58 of the screw or worm 40 which engages and drives said grate bars 57, is relatively reversed to the major portion of the worm 40, and thus the grate bars 57 will be caused to rotate in the direction of the arrows F, thereby affording a mechanical discharge of ash through space 56.

I provide means for delivering fuel to the grate structure, such means preferably comprising a chute 59 which is connected to an inverted hopper 60 fixedly mounted on the furnace inlet 61. The furnace inlet 61 may be formed integrally with the bracket 46 and movable therewith, said inlet having a base portion 62 on which a plurality of serrated rollers 63 are mounted. The rollers 63 extend transversely across the inlet 61 and are provided with worm gears 64—64, (seen in Figure 10), which latter are in meshing engagement with a worm 65 mounted on a shaft 66, which latter is mounted in bearings 67. The rollers 63 are adapted to rotate in the direction of the arrow G, Figure 2.

The rollers 63 are adapted to be driven at different speeds as desired, and to this end, I provide variable speed mechanism shown in Figures 1 and 10. The variable speed mechanism and the means for driving the rollers 63 comprise a frusto-conical gear 68, fixedly secured to the shaft 66, and a second frusto-conical gear 69, reversed with respect to the gear 68, and in proximity thereto. The gear 69 is mounted on a shaft 70 carried in bearings 71. The shaft 71 is driven by the shaft 52 through worm gearing 72. In order to transmit motion between the gears or rolls 68 and 69, a pinion or roll 73 is carried by a rocking link 74, and said pinion is in permanent driving engagement with both of the gears 68 and 69. However, the pinion 73 is slidable, within limits, between said gears 68 and 69 by the provision of a yoke 75, operatively connected to the link 74, and pivoted at 76 for oscillation manually or otherwise, by a handle 77. It will thus be seen that the rate of feed of fuel to the revolving grate bar structure may be varied manually or automatically as conditions require, and that such feed control is attainable independently of the rate of speed at which the grate bars may be revolving.

Beneath the base 62 there is provided an angularly displaceable fuel deflecting tray 78, said tray being pivotally mounted at 79, and arranged so that it may be manually displaced angularly with respect to the fuel feeding mechanism, whereby to change the location of the point at which fuel is deposited upon the grate structure.

In this form of the invention it will be observed that fuel is introduced into a furnace by deposition on a grate structure, the latter being composed of revoluble grate bars, and as these bars are constantly rotated at a desired suitable speed, the fuel, in course of consumption, is carried from one end of the furnace to the other end thereof. As the grate bars are in slight spaced relationship, and as each bar is provided with perforations, the resulting fine ash as formed is therefore constantly removed from the fuel bed and deposited in the ash pit 22. The constant agitation of the fuel due to its passage over the uneven surface of the grate bar insures an even distribution of the fuel throughout the furnace and thus affords a level fire in which holes cannot occur. The uneven abrasive surfaces of the grate bars serve to remove the partly consumed fuel from that which is not entirely consumed, and thereby facilitates complete ignition. Furthermore, the larger particles of ash or any fuel which is not entirely consumed, will not pass through the perforations of the grate bars, but will be deposited at one end of the ash pit, from whence it may be retrieved for further use.

A flue 79a is provided at the forward end of the furnace and affords an exit for distilled gases developed during combustion at that end of the furnace, and the resultant coke (fixed carbon) is conveyed toward the rear end of grate, and may be burned at this location, or thence it is deposited through opening 56, and conveyed to a point of utilization.

The fuel feeding mechanism, represented by the rollers 63, serves to distribute the fuel over the entire width of the grate structure, and thus the fuel is not deposited only in one spot. This is further aided by the provisoin of the flaring hopper 60.

The grate bar structure may be readily bodily removed by separating the bracket 46 from the front end of the furnace, and running the grate structure out upon the rails 38. A removable wall 38' permits access to the grate in use.

Referring now more particularly to the alternate form of this invention illustrated in Figures 5 and 6, there is provided the fire box 80 below the water tubes 81, and having an entrance opening 90. The fire box is provided with a base 82 on which the modified form of grate structure generally designated 83 is mounted. In this arrangement, a baseplate 84 is provided on an abutment 85 built of fire brick, or the like. The base 84 is provided with an upstanding external flange 86, on the top of which is mounted a series of fixed bearings 87, each of the bearings 87 receiving one of the shafts 88, and on said shafts there is provided the lower series of revolving grate bars 89. The shafts 88 are provided with worm gears 91, each of which is disposed below and is in meshing engagement with a worm or screw 92, similar to the screw 40 hereinbefore described.

The grate bar structure further includes an upper series of revolving grate bars 93, secured to shafts 94 which bars are revolubly mounted in bearings 95, said bearings being removably, though fixedly secured, to a depending longitudinally extending flange 96 provided on the cover plate 97. On the outer ends of the shaft 94 are provided worm gears 98 which are in continuous meshing engagement with the worm or screw 92. It will be observed that as the screw 92 is rotated the upper and lower series of grate bars will be operated in opposite directions, and this accomplishes a purpose which will presently appear.

The screw 92 is mounted in split bearings 99 and 100, said bearings being carried by wheels 101 and 102 which are adapted to run on rails 103. The bearing 99 is provided with a pedestal portion 104, which is fixedly connected to a front end section 105, said section 105 having a wall 106 on which a fuel delivery hopper 107 is mounted. The section 105 furthermore supports an abutment member 108, and the wall 106 and abutment 108 form an entrance 109 which communicates with the entrance opening 90.

Motion is imparted in the proper direction to the screw 92 by the provision of a suitable motor (not shown), which drives a shaft 110, said shaft extending across the front of the furnace and having a worm 111 fixedly secured thereto, which worm is in meshing engagement with the worm gear 112 fixedly secured to the screw 92.

At the inner end of the grate bar structure shown in Figure 5, that is, the end remote from the entrance opening 90, there are provided, both in the upper and lower series of grate bars, two or more separated or spaced grate bars 113 and 114, and a portion 115 of the screw 92 are provided with reversed threads for operating said grate bars 113 and 114 in a direction opposite to that of the major portion of the grate bar structure. The space 116 which may be adjustable afforded between the endmost of the grate bars 91 and 98, and the grate bars 113 and 114, permits the larger particles of ash and reclaimed coke to drop below the grate.

In this form of the invention, it is possible to employ both the grate bars shown in Figures 3 and 13, the grate bars with the greater number of apertures being placed in the upper series, and the grate bars with the lesser number of openings being placed in the lower series, or vice versa, so that a thorough sifting of the ash is attained. While the spaced grate bars at the rear end of the grate, that is, the delivery end, are shown as arranged in vertical alinement, it will be obvious that they may be placed out of alinement so as to deposit ash at two or more points and thus separate the ash of different sizes.

In the form of the invention shown in Figs. 5 and 6, a modified construction of fuel delivery mechanism is shown and here takes the form of a tray element comprising the sections 117 and 118, pivotally connected at 119. The section 117 is pivotally mounted at 120 on the walls 106, and both of the pivot points may comprise revolving shafts on which sprocket wheels 121 and 122 are mounted. The sprocket wheels 122 and 121 are operatively connected by a chain 123, and motion is imparted to said sprocket wheels by the provision of a twisted chain 124, which is operatively connected through a sprocket (not shown) mounted on the shaft 110. The sprockets 121 and 122 operate a conveyor arranged in the tray section 117 so as to regulate the rate of feed of fuel. The quantity and size of fuel supplied to the furnace is regulated by the provision of a roller 125 mounted on a shaft 126 carried by the abutment 108. Motion is imparted to the shaft 126 through a sprocket wheel 127, mounted on said shaft, and a chain 128 which is trained over a sprocket 129 mounted on the shaft 110.

The tray sections may be relatively angularly adjusted or may be adjusted angularly to increase, or decrease the space between the abutment 108 and the section 117, for regulating both the quantity and size of fuel supplied in a given time, and the point at which the fuel is deposited upon the grate structure. Any desired mechanism may be employed for manually adjusting the angularity of the tray section 117 and 118. To remove this grate structure the lower set of bearings are removed and the screw may then be withdrawn on the supporting wheels.

In Figures 11 and 12 there are illustrated alternate forms of the revolving bar grate structure illustrated in Figures 1, 2, 5, and 6. Referring to Figure 11, the grate bars (not shown) are mounted on the shafts 130—130, and said shafts carry worm gears 131, which latter are in meshing engagement with the motion imparting screw 132. In this instance the screw is mounted in an enclosing casing 133, containing a lubricant, provided with openings 134, for accommodating the worm gears 131.

In Figure 12 a box-like structure 135 is mounted in the wall 136 of the furnace, and a shaft 137 extends longitudinally of the box 135. The box is provided with an inner wall 138, in which the grate bar shaft 139 is journaled. The grate bar 140 is carried by the shaft 139, and a bevel gear 141, fixedly connected with the shaft, is in meshing engagement with a complementally arranged bevel gear 142, which is keyed to the shaft 137. This arrangement is provided where the furnace is of relatively great width and where there might be a tendency for the grate bars to sag. To prevent such sagging of the grate bars, I divide same into two or more sections by the provision of a transverse partition 143, said partition having an external circumferential V-shaped groove 144 adapted to receive the edge 145 of a supporting flange 146, constituting a bearing or support.

Reference may now be had to Figure 7, wherein an alternate form of the grate structure of this invention is illustrated as installed for continuously feeding fuel in course of consumption, from two sides of a furnace to the center thereof.

In the arrangement shown in Figure 7 the furnace comprises a base portion 189 in which an ash pit 190 is disposed. The fire box 191 is provided, having the usual arches, 191a and 192a, and above these arches the water or fire tubes 192 are arranged. Air enters the fire box 191 at 189a through conduit 191b to the space between the arches, and is thus preheated, the rear of the arches being picked up at 193a. The entrance 189a is controlled by a damper 192a, which latter may be manually or automatically operated as required by the provision of a chain or cable 192b, trained over a sheave 192c. The superheated air thence passes from the space between the arches via ducts 193a and 193b to the fuel at the respective entrances above the grates 195 and 196, thus entering the fire box 191 with the fuel.

Fuel inlets are provided on either side of the fire box 191 and comprise hoppers 193 and 194, said hoppers depositing fuel directly upon the outer end of the grate bar structures 195 and 196, these grate bar structures being constructed substantially in accordance with either the grate bar structure shown in Figure 2, or that shown in Figure 5. The grate bar structure 195 is adapted to propel fuel in course of consumption in the direction of the arrow I, and the grate bar structure 196 is arranged to propel fuel in course of consumption in the direction of the arrow J. Thus, the two grate structures progressively deliver fuel and the larger particles of ash to a central space 197 arranged between the adjacent ends of said grate bar structures. The ash passes between relatively large grate bars 198 and 199 and is deposited in a tapered hopper 200. The hopper 200 is arranged with its lower open end disposed above a longitudinally extending screw conveyor 201, arranged in a trough 202, and the ash pit 190 communicates, through openings 203—203, with a jacket 204 surrounding the trough 202, said jacket having a trough 205 at its bottom in which a second screw conveyor 206 is arranged. A pair of doors or baffles 207 are hingedly mounted on the lower ends of the wall of the hopper 200, and, as shown in Figure 7, are intended to deflect the finer ash, which is deposited in the hopper 190, into the jacket 204, from whence it is conveyed to a desired point by the screw conveyor 206. For the purpose of delivering all of the ash to the screw conveyor 201, a second pair of baffles 208 are provided and connected by the provision of links 209 to the baffles 207, and when it is desired to deflect all of the ash into the conveyor 201, the doors 207 are moved to the dotted line positions, which closes the openings 203. This may tend to prevent the passage of the larger particles of ash in the hopper 200, but as the doors 207 do not entirely close the bottom of the hopper 200, but leave an opening at least as large as the space between the rollers 198 and 199, most of the large particles will be deposited in the conveyor 201. Thus, it will be seen that the ash deposited from the grate structure may be selected in accordance with its size for future use, and then be conveyed to the desired point. This is rendered possible because of the uneven surfaces of the revolving grate bars.

In Figures 8 and 9, there is illustrated an alternate form of the invention adapted for employment in connection with an underfeed stoker, wherein the fuel is fed upwardly into the furnace at the center thereof, and then, in course of consumption, caused to move outwardly from said center.

In Figures 8 and 9 there is provided a base 210 which supports the grate structures 211 and 212, the grate structure 211 operating in the direction of the arrow K and the grate structure 212 operating in the direction of the arrow L, Figure 9. The grate structures comprise the two series of grate bar elements 213 and 214, operated by a shaft 215 provided with reversed screw threaded portions 216 and 217. Similarly to the worm or screw 40 shown in Figure 2, each of the threaded portions 216 engages with its complemental series of revoluble grate bars for operating them in opposite directions, and at the extreme outer ends of the grate bar structure detached or spaced grate bars 218 and 219 are provided, these grate bars affording ash outlets 220 and 221.

Below the grate bars, there is provided an ash trough 222, having a screw conveyor 223 therein, and the inclined side walls 224—224 extend upwardly under the grate and terminate beneath the openings 220 and 221, said inclined walls serving to convey the larger particles of ash into the conveyor. A second pair of inclined walls 225 is provided above the walls 224, and in spaced relation thereto, and the walls 225 serve to collect the finer ash which drops through the grate bars. The draft space 226 afforded by the walls 225 is partitioned at 227, said partitions having movable closures to vary the draft pressure as desired in the chambers 228—228, and these chambers may be made to communicate with either the space 226, or with the wall 224, by the provision of movable closures 229—229 and 230—230 respectively. The lower ends of the walls 225 are in spaced relation, and trap doors 231 serve to close this space.

The stoking mechanism, in other words, the mechanism for supplying fuel at the center of the grate structure, comprises a tight trough 232, said trough having a top outlet at 234 between the adjacent ends of the grate structures 211 and 212. The trough extends beyond the front wall 235 of the furnace and is provided with a cylinder 236 in which a fluid pressure operated piston 237 reciprocates. Coal or other fuel is supplied through a hopper 238 in front of a plunger 239, and this fuel is forced by said plunger through the fuel inlet 240 into the trough 232. The fuel is progressively moved along and upward through the length of the trough 232 by the provision of a bar 241, connected by a link 242 to the plunger 239, and a plurality of upstanding abutments 243—243 are carried by said bar.

It will be observed that in operation the conveyor 223 disposes of the ash through an outlet 244, and it will also be seen that the fuel feed plunger connected to the bar 241 and abutments 243, serves to carry the fuel rearward and upward over the curved upper side of the trough 234 to the grate structures 211 and 212.

Air draft ducts 245 are arranged conveniently at one end of the furnace and the supply of air therethrough is governed in any desired manner, manually or automatically, by operating the dampers 246.

From the foregoing description and the accompanying drawings, it will be observed that there is provided a fuel feeding device or stoker which may be readily adapted to various types of furnaces, and as previously pointed out the provision of the curvilinear grate bar surfaces increases the burning surface of the grate for a given area at least one-third over that ordinarily attained, and at the same time, while revolving, does not vary the distance between the bars, which would occur with flat bars. Furthermore, the features of operation and the functions possible of attainment in this invention permit of employment of the device either as a steam generating plant or as a coking mechanism, or permits of employment of the device both as a steam generating plant and as a coking mechanism. The provision of the outlet 79a shown in Figures 2 and 5, permits of the recovery of unburned gases which usually are generated when fuel is first deposited on a fire, and which gases usually pass off and are wasted or where furnaces are operated for by-products. An important feature of this invention resides in the function of the grate bars wherein they constantly remove ash as formed, so that not only is the fuel properly sized and distributed to maintain a level fire and thus prevent "holes", but the fire is always maintained free of ash. Thus, for all practical purposes, no clinkers can form. In all cases the revoluble grate bars or groups of revoluble grate bars may be used in a level, horizontal plan as shown or at any desired angle therefrom.

The foregoing features are common to all of the forms of the invention described and will be common to any further modifications which employ the revoluble abrasive grate bars of this invention. These grate bars, being provided with air ducts, afford an even and well distributed area of draft, in fact, by the provision of the flared parts of the draft apertures, best shown in Figures 13 and 14, there is practically one hundred per cent draft area afforded, which further cooperates to prevent the development of cool spots or holes in the fire. This arrangement of the draft openings prevents burning of the grate as plenty of fresh air is always passing through the bars and they are constantly presenting fresh surfaces to the fire bed.

It will be obvious to those skilled in the art that this stoking device is adaptable for use with various kinds of fuel, with any form or method of draft, natural or mechanically produced and conveniently and effectively responsive to any form of regulation, thereby affording a highly efficient and dependable means for carrying out combustion operation, whether for the purpose of producing power, or for use in connection with metallurgical, by-product processes and commercial and industrial gas manufacturing. This will be clear when it is seen that the device may be readily employed for pre-treatment of the fuel and that the distillates therefrom may enter into the general combustion, or they may be diverted wholly or in part to other uses as desired.

Variation of the draft and other functions performed may be employed in operation in conjunction with the device and may be accomplished manually or automatically in response to variations in one or more factors incident to or resultant from the operation of the stoker and the conditions of combustion prevailing. The manner of controlling draft as shown in the drawings is purely exemplary of one manner of carrying out the principle involved.

It will be readily understood that any of the grate structures hereinbefore described may be modified within the spirit of this invention for application to various installations, and that the structures are largely interchangeable. It will also be understood that while the grate bar structures are here illustrated as applied to a stationary furnace installation, they may be readily applied, by slight modifications, to locomotive and marine boilers, metallurgical and other furnaces.

Having thus described my invention and illustrated its use, what I claim as new and desire to secure by Letters Patent is:—

1. In a device of the character described, in combination, a grate structure comprising two superposed series of perforated revoluble bars mounted upon relatively fixed axes, a worm gear connected to each of said bars, and a single worm operatively connected with all of said gears.

2. In a device of the character described, in combination, a plurality of revoluble perforated grate bars arranged in parallel relationship on fixed axes, certain adjacent grate bars being grouped and spaced from the remaining group of adjacent bars but in substantially the same plane means for driving all the bars in each group in the same direction and means for driving one of said groups of bars in an opposite direction to the remaining group of grate bars.

3. In a device of the character described, in combination, a grate structure comprising a series of perforated cylindrical bars mounted revolubly on fixed axes in substantially the same plane, a continuous part of said series of bars being spaced from the remaining part of said series and the bars thereof adapted to revolve in an opposite direction thereto.

4. In a device of the character described, in combination, a grate structure comprising two or more series of adjacent perforated cylindrical bars mounted revolubly on fixed axes in substantially the same plane, said two or more series of bars being in spaced relationship and operating in opposite directions.

5. In a device of the character described, in combination, a grate structure comprising a pair of superposed series of perforated revoluble bars mounted upon relatively fixed axes, each of the bars of said grate structure having a motion transmitting element thereon, and a single revoluble driving element extending between said series and operatively connected with each of said motion transmitting elements.

6. In a device of the character described, in combination, a grate structure including a plurality of hollow perforated bars arranged in parallel relationship in superposed groups of adjacent bars with a space between adjacent groups of said bars in the same plane, and means for imparting rotation to the bars of said groups.

7. In a device of the character described, in combination, a grate structure including a plurality of hollow perforated bars arranged in parallel relationship in groups of adjacent bars in the same plane with a space between adjacent groups of bars, and means for imparting simultaneous rotation in opposite directions to the bars of said groups.

8. In a device of the character described, in combination, a grate bar structure comprising a plurality of major and minor portions including groups of adjacent revoluble grate bars, said groups being mounted in substantially the same plane, means for rotating the bars of the major portion of said structure in one direction and means for rotating the bars of a minor portion of said structure in the same plane but in the opposite direction.

9. In a device of the character described, in combination, a grate structure including a series of revoluble grate bars, a carriage having bearings on which said bars are mounted for bodily movement of the series, a driving member on said carriage for said bars, one set of bearings permitting lateral individual removal of any of said bars without disturbing the remaining bars.

10. In a device of the character described, in combination, a grate structure including a series of revoluble grate bars, a carriage having bearings on which said bars are mounted for bodily movement of the series, a driving member on said carriage for said bars, one set of bearings opposite to said driving member permitting lateral individual removal of any of said bars without disturbing said driving member or the remaining bars.

11. In combination a furnace, a grate structure comprising a plurality of revoluble grate bars arranged in parallel relationship on fixed axes and arranged in a plurality of groups each comprising a plurality of adjacent grate bars, the grate bars in each group all rotating in the same direction for conveying fuel through the furnace during combustion, adjacent groups in substantially the same plane being spaced apart, thus affording an ash outlet, and driving means operatively connected to all the grate bars in such a manner as to impart rotation in the same direction to all the grate bars of one of said adjacent groups and rotation in the opposite direction to the other of said adjacent groups whereby the consumed fuel is conveyed to said ash outlet.

FRANCIS H. BROWN.